United States Patent [19]

Blinsinger

[11] Patent Number: 4,869,385
[45] Date of Patent: Sep. 26, 1989

[54] FREEZABLE LIQUID CONTAINER

[76] Inventor: Curtis H. Blinsinger, Box 310, Marlton, N.J. 08053

[21] Appl. No.: 234,607

[22] Filed: Aug. 22, 1988

[51] Int. Cl.$^4$ .......................... A01K 7/00; B65D 6/02
[52] U.S. Cl. .................................. 220/4 R; 119/72; 220/67; 220/83; 248/318
[58] Field of Search ............... 119/51 R, 51.5, 52 R, 119/58, 61, 72, 74; 211/88; 220/4 R, 67, 83, 93, 92, 94 R; 248/318

[56] References Cited

U.S. PATENT DOCUMENTS

| | | | |
|---|---|---|---|
| D. 202,134 | 8/1965 | Pail | D58/17 |
| D. 289,452 | 4/1987 | Fuller | D30/13 |
| 291,904 | 1/1884 | Hill | 220/67 |
| 572,234 | 12/1896 | Windle | 220/67 |
| 710,341 | 9/1902 | Rymer | 119/72 |
| 738,768 | 9/1903 | Brown | 119/74 |
| 1,024,841 | 4/1912 | Emery . | |
| 1,191,184 | 7/1916 | Hooper . | |
| 1,206,281 | 11/1916 | Wood | 119/74 |
| 1,796,297 | 3/1931 | Mahlstedt . | |
| 1,798,984 | 3/1931 | Petersen . | |
| 2,321,981 | 6/1943 | Bowers | 211/71 |
| 2,365,498 | 12/1944 | Specketer | 119/61 |
| 2,599,844 | 6/1952 | Kounkel | 119/61 |
| 2,631,735 | 3/1953 | Levesque | 211/88 |
| 2,635,797 | 4/1953 | Siebert | 224/42.46 |
| 2,675,782 | 4/1954 | Lage | 119/61 |
| 3,015,412 | 1/1962 | Klages | 220/91 |
| 3,163,338 | 12/1964 | Gottsegen | 224/42.01 |
| 4,147,320 | 4/1979 | Biedebach | 248/318 |
| 4,235,407 | 11/1980 | Haas | 248/318 |
| 4,385,742 | 5/1981 | Rocquin | 248/318 |
| 4,798,170 | 1/1989 | Depiazzy | 119/61 |

FOREIGN PATENT DOCUMENTS 0005391 4/1890 United Kingdom ................. 119/61

Primary Examiner—Jimmy G. Foster
Attorney, Agent, or Firm—Berlin, N.J. 08009-0127; Thomas A. Lennox

[57] ABSTRACT

A freezable pet water dish having four flat trapezoid shaped wall panels the parallel sides on the top and on lower sides with an inverted tray shaped bottom, which is perpendicular with a rear wall panel, all constructed of stainless steel sheet welded at all edges to form the container, with a semi-circular rigid rod handle welded to the back panel with a hook extension of the rods at a median portion to hook over a fence.

16 Claims, 1 Drawing Sheet

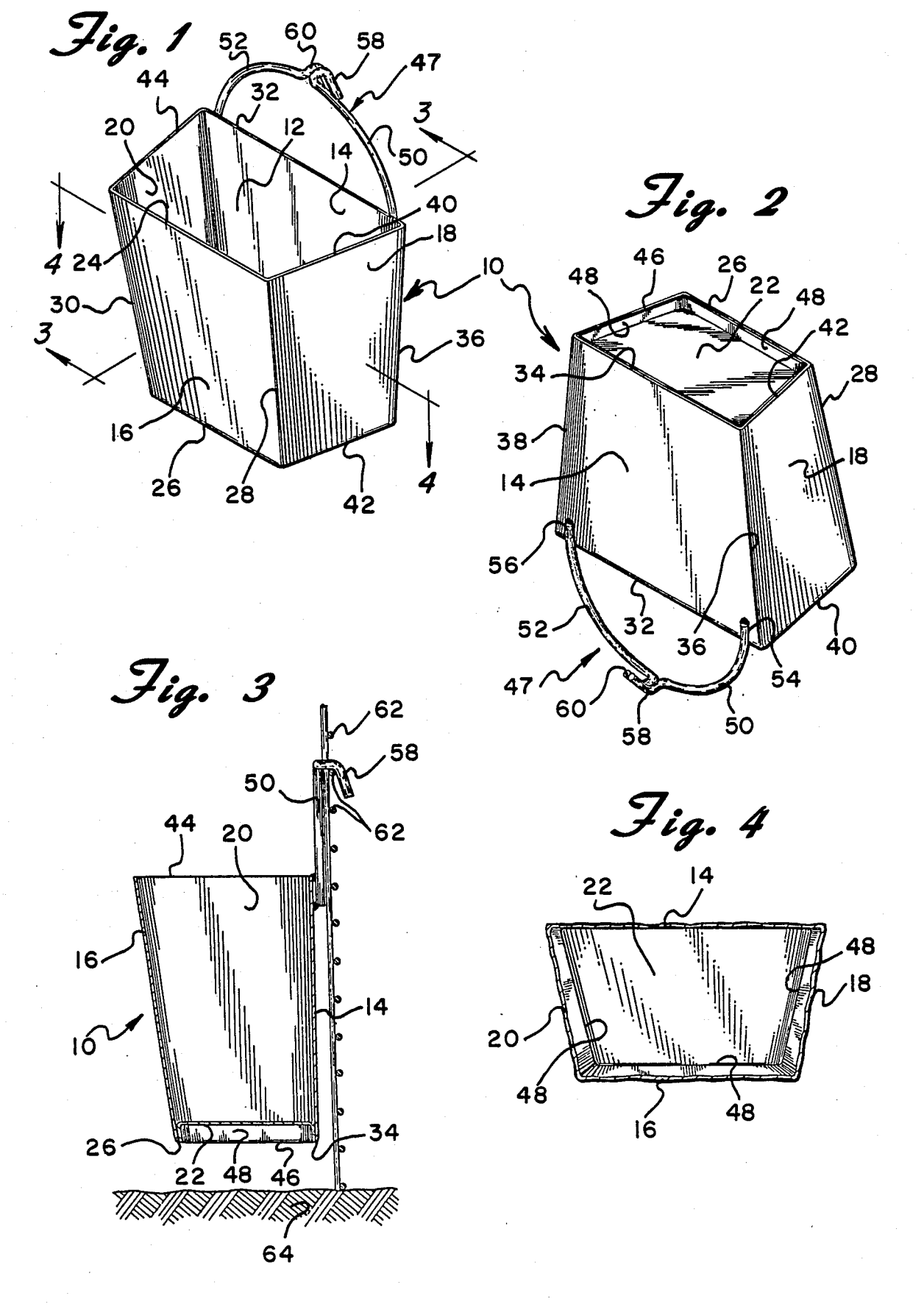

FREEZABLE LIQUID CONTAINER

BACKGROUND OF THE INVENTION

This invention involves a liquid container capable of being frozen without damaging the container and more specifically involves a freezable water dish suitable for animals.

For many animals and particularly, dogs that are used for hunting, an outside run is usually provided, including a fenced in area to prevent the dog from wandering. Similar outdoor pens are provided for animals in zoos, kennels and animal care centers.

It is desireable to place a water drinking dish for these animals in the pen area in order to avoid having the water spilled in the enclosed portion of the living quarters. Unfortunately, in colder climates these water dishes freeze usually splitting or breaking the container. Some containers are satisfactory for a time but any roughened surfaces tend to cause the ice to catch and damage the dish beyond any further use. Plastic dishes are chewed by the animals and quickly destroyed. Metal dishes are broken and deformed when the water freezes. It is further desirable to provide a dish that cannot easily be over turned that can be reached easily from the outside of the pen area to refill it with water.

A number of water dishes have been provided in the prior art, but none satisfy the above needs nor attain the objects described hereinbelow.

SUMMARY OF THE INVENTION

It is an object of the present invention to provide a liquid container which when frozen solid, does not damage the container.

It is a particular object of the present invention to provide a freezable drinking dish for animals, particularly suited for dogs which may be left outside and if frozen will not be damaged.

It is an additional object of the present invention to provide a drinking dish that is nestable allowing a multiplicity of empty containers to be carried at one time.

It is an additional object of the present invention to provide water dishes for animals that can be carried in pairs in each hand such that the dishes abut when carried by the handles allowing at least four containers to be carried by a person in the full condition.

It is an additional object of the present invention to provide an animal dish which can be hung on a fence resting flat against the fence reducing the tendency to tip when used by the dog.

It is a further object of the present invention to provide a drinking dish that can either be hung on a fence or rest flat on the floor.

It is an additional object of the present invention to provide a freezable liquid container wherein the frozen liquid can be removed by merely tapping the container upside down to dislodge the block of liquid.

It is a particular object of the invention to provide an animal dish, in particular a dog water drinking dish which will essentially last a lifetime.

It is a specific object of the present invention to provide a container construction of stainless steel that will not deform in case the liquid filling the container is frozen.

The invention is a freezable liquid container including a bottom panel with a rear edge, a front edge, and two side edges. The container further includes four wall panels, each having a lower edge, a top edge, and two side edges, the wall panels including a rear wall panel, two side wall panels, and a front panel. The side edges of the wall panels are coterminous and sealably connected along the entire adjacent side edges, and the lower edges of the wall panels are coterminous and sealably connected to the edges of the bottom panel. Each of the wall panels are trapezoid shape with the parallel sides of the trapezoid shape being the top and lower edges, with the lower edge being shorter than the top edge.

It is preferred that the rear wall panel be perpendicular with the bottom panel, and that all of the panels be flat sheets. It is further preferred that the length of side edges of the front wall panel be equal, and the length of the side edges of the rear wall panel be equal. It is further preferred that the rear and both side wall panels be a continuous sheet, and that all of the panels be stainless steel sheet. It is further preferred that the bottom panel further comprise four depending shoulders from the edges of the bottom panel forming an inverted tray shape, the shoulders being connected to the wall panels proximate the lower edges. It is further preferred that the container further include a container hanging means including a handle member attached at both ends proximate the top edge of the rear wall panel and be sufficiently shaped to position a median section of the member above the top edge of the rear wall panel, with a hook member depending from the median section of the handle member and angled downwardly and rearwardly. It is further preferred that the handle member include two rod members attached together end to end at the median section and the ends of the joined member attached to the rear wall panel. The hook member includes joined extensions of the rod members of the ends at the median section. It is preferred that each wall panel have a lower edge that is one-half to two inches shorter than the top edge. It is more preferred that the difference be about one inch.

The invention is also a freezable liquid container including a bottom panel with a rear edge, a front edge, and two side edges. The container also includes four flat trapezoid shaped wall panels, being a rear wall panel, two side wall panels, and a front wall panel; each panel having a lower edge, a top edge, and two side edges. The side edges of the wall panels are coterminous and sealably connected along the entire adjacent edges, and the lower edges of the wall panels are coterminous and sealably connected to the edge of the bottom panel. The rear wall panel is perpendicular with the bottom panel with the parallel sides of the trapezoid shape being the top and lower edges, with the lower edge being shorter than the top edge. Each side wall panel has the parallel sides of the trapezoid shape as the top and lower edges, with the lower edge being shorter than the top edge, and the front wall panel has the parallel sides of the trapezoid shape as the top and lower edges, with the lower edge being shorter than the top edge.

The invention is also a freezable liquid container including four wall panels, each being a trapezoid shaped flat sheet with a lower edge, a top edge, and two side edges, the wall panels being a rear wall panel, two side wall panels, and a front panel, the side edges of the wall panels being coterminous and sealably connected along the entire adjacent edges. The container also includes a bottom panel means including a flat bottom panel having a rear edge, a front edge, and two side edges with four shoulders depending from the lengths of the edges of the bottom panel to form an inverted tray shape, the shoulders being sealably connected to the wall panels proximate the lower edges. The rear wall panel is perpendicular with the bottom panel, has equal length side edges, and has the parallel sides of the trapezoid shape being the top and lower edges, with the lower edge being shorter than the top edge. Each side wall panel has the parallel sides of the trapezoid shape being the top and lower edges, with the lower edge being shorter than the top edge. The front wall panel has equal length side edges and has the parallel sides of the trapezoid shape being the top and lower edges, with the lower edge being shorter than the top edge.

The invention is also a freezable liquid container including four flat wall panels, each having a lower edge, a top edge, and two side edges, the wall panels including a rear wall panel, two side wall panels, and a front panel, the side edges of the wall panels being coterminous with and sealably connected along the adjacent side edges. The container is also a bottom panel means including a bottom panel with a rear edge, a front edge and two side edges, with four depending shoulders from the edges of the bottom panel forming an inverted tray shape, the shoulders being coterminous and sealable connected to the wall panels proximate the lower edges. Each of the wall panels is a trapezoid shape with the parallel sides of the trapezoid shape being the top and lower edges, and the lower edge being shorter than the top edge.

BRIEF DESCRIPTION OF THE DRAWINGS

FIG. 1 is a perspective view of a freezable liquid container of the present invention viewed from the top front right side of the container.

FIG. 2 is a perspective view of the container illustrated in FIG. 1 viewed from the bottom rear left side of the container.

FIG. 3 is a vertical cross-sectional view taken along lines 3—3 of FIG. 1 also illustrating a screen fence on which the container is hung.

FIG. 4 is a horizontal cross-sectional view taken along lines 4—4 of FIG. 1.

DESCRIPTION OF THE PREFERRED EMBODIMENTS

The dish illustrated in FIGS. 1-4 satisfy all of the objects listed above. The dish is constructed of 0.48 inch thick stainless steel, but the thickness may be varied to suit the intended use. The handle is constructed of 3/16th inch stainless steel rod and all abutting surfaces are arc welded to from a continuous water tight seal and attachment between adjacent edges. Dog water dish 10 is illustrated in FIGS. 1 and 2 having generally unobstructed opening 12 through the top of the dish construction. The liquid holding container is constructed of four wall panels, rear wall panel 14, front wall panel 16, right side wall panel 18 and left side wall panel 20. Bottom panel 22 closes the container with its edges coterminous with and sealably connected to the lower edges of each wall panel. Wall panels 14, 18 and 20 are a single piece of stainless steel sheet with front wall panel 16 being a separate trapezoidal shaped panel welded along its generally vertical edges 28 and 30 and at its bottom edge 26 to bottom panel 22. Front wall panel 16 has six and one-quarter inches long top edge 24 and five and one-eighth inches long lower edge 26, which are parallel to each other. Right front edge 28 and left front edge 30 are both seven and one-eighth inches long and join wall panels 16 and 18 and panels 16 and 20, respectively. Rear wall panel 14 is a trapezoidal shape with eight and one-quarter inches long top edge 32 and six and three-quarters inches long lower edge 34, which are parallel to each other. Right rear edge 36, which joins the side edges of panels 14 and 18 and left rear edge 38 which joins the side edges of panels 14 and 20, are both seven inches long. Right side wall panel 18 has four and three-quarters inches long top edge 40 and three and three-quarters inch long lower edge 42 which are parallel to each other. Since rear wall panel 14 is perpendicular to bottom panel 22 as well as to lower edges 42 and 48, edges 28 and 36 are not equal in length. For left side wall 20, four and three-quarters inches long top edge 44 and three and three-quarters inches long bottom edge 46 are parallel to each other. As with side wall 18, edges 30 and 38 are not of equal length since rear wall 14 is perpendicular with lower edge 46. Thus, as constructed, rear wall panel 14 and front wall panel 16 may be described as regular trapezoids in that the non-parallel sides are of equal length. Side wall panels 18 and 20 are mirror images of each other and the non-parallel sides are not of equal length. It is critical that each lower edge of each panel be of a shorter length than the top edge length of that panel. Bottom panel 22 includes depending shoulders 48 from each edge such that the combination of panel 22 and depending shoulders 48 form a pan shape which is inverted when container 10 is upright. As constructed here, panel 22 and shoulders 48 are of a single sheet of stainless steel with shoulders 48 formed in that shape. The lower edges of the wall panels are welded along the entire length to shoulders 48 achieving a construction of substantial strength. Handle 47 is constructed of rods 50 and 52 attached by welds at ends 54 and 56 to positions proximate rear top edge 32 and edges 36 and 38 respectively. Rods 50 and 52 are bent to form a semi-circular shape and welded together at a median portion where a hook member is formed by joining ends 58 and 60 angled downwardly and rearwardly from device 10. When two containers 10 are positioned rear wall panel to rear wall panel, handles 47 are abutted together so that a person's hand can easily lift both containers at the same time. The flat rear walls will abut because of the center of gravity of each container allowing easy transport.

FIG. 3 is a cross-sectional view along lines 3—3 of FIG. 1 illustrating the interior and the structure of edges 26 and 34. Hook member 58 (and 60 hidden in this view) hook over horizontal wire fence screen 62 close to ground 64. It is usually possible to choose a horizontal screen wire 62 close enough to the ground that container 10 can hook over the screen and also rest on the ground. The cross-sectional view in FIG. 4 shows the shape of the trapezoid shape of bottom panel 22.

While this invention has been described with reference to the specific embodiments disclosed herein, it is not confined to the details set forth and the patent is intended to include modifications and changes which may come within and extend from the following claims.

I claim:
1. A freezable liquid container comprising:
 (a) a bottom panel with a rear edge, a front edge, and two side edges,
 (b) four wall panels, each having a lower edge, a top edge, and two side edges, the wall panels comprising a rear wall panel, two side wall panels, and a front panel, the side edges of the wall panels being coterminous and sealably connected along the en- tire adjacent edges, and the lower edges of the wall panels coterminous and sealably connected to the edges of the bottom panel, wherein each of the wall panels are a trapezoid shape with the parallel sides of the trapezoid shape being the top and lower edges, with the lower edge being shorter than the top edge, and (c) a container hanging means comprising:
  (i) a handle member attached at both ends proximate the top edge of the rear wall panel comprising two rod members attached at a median section and at ends of the joined two members to the rear wall panel and sufficiently shaped to position the median section of the joined members above the top edge of the rear wall panel, and
  (ii) a hook member depending from the median section of the handle member and angled downwardly and rearwardly, the hook member comprising joined extensions of the rod members at the median section.

2. The container of claim 1 wherein the rear wall panel is perpendicular with the bottom panel.

3. The container of claim 1 wherein all of the panels are flat sheets.

4. The container of claim 1 wherein the length of side edges of the front wall panel are equal, and the length of the side edges of the rear wall panel are equal.

5. The container of claim 1 wherein the rear and both side wall panels are a continuous sheet.

6. The container of claim 1 wherein the panels are stainless steel sheet.

7. The container of claim 1 wherein the bottom panel further comprises four depending shoulders from the edges of the bottom panel forming an inverted tray shape, the shoulders being connected to the wall panels proximate the lower edges.

8. A freezable liquid container comprising:
  (a) a bottom panel with a rear edge, a front edge, and two side edges,
  (b) four flat trapezoid shaped wall panels, being a rear wall panel, two side wall panels, and a front wall panel, each panel having a lower edge, a top edge, and two side edges, the side edges of the wall panels being coterminous and sealably connected along the entire adjacent edges, and the lower edges of the wall panels coterminous and sealably connected to the edges of the bottom panel,
  wherein the rear wall panel is perpendicular with the bottom panel with the parallel sides of the trapezoid shape being the top and lower edges, with the lower edge being shorter than the top edge,
  wherein each side wall panel has the parallel sides of the trapezoid shape as the top and lower edges, with the lower edge being shorter than the top edge, and
  wherein the front wall panel has the parallel sides of the trapezoid shape as the top and lower edges, with the lower edge being shorter than the top edge, and
  (c) a container hanging means comprising:
    (i) a handle member attached at both ends proximate the top edge of the rear wall panel comprising two rod members attached at a median section and at ends of the joined two members to the rear wall panel and sufficiently shaped to position the median section of the joined members above the top edge of the rear wall panel, and
    (ii) a hook member depending from the median section of the handle member and angled downwardly and rearwardly, the hook member comprising joined extensions of the rod members at the median section.

9. The container of claim 8 wherein all of the panels are flat sheets.

10. The container of claim 8 wherein the length of side edges of the front wall panel are equal, and the length of the side edges of the rear wall panel are equal.

11. The container of claim 8 wherein the panels are stainless steel sheet.

12. The container of claim 8 wherein the bottom panel further comprises four depending shoulders from the edges of the bottom panel forming an inverted tray shape, the shoulders being welded to the wall panels proximate the lower edges.

13. A freezable liquid container comprising:
  (a) four wall panels, each being a trapezoid shaped flat sheet with a lower edge, a top edge, and two side edges, the wall panels being a rear wall panel, two side wall panels, and a front panel, the side edges of the wall panels being coterminous and sealably connected along the entire adjacent edges,
  (b) a bottom panel means comprising a flat bottom panel having a rear edge, a front edge, and two side edges with four shoulders depending from the lengths bottom edges of the bottom panel to form an inverted tray shape, the shoulders being sealably connected to the wall panels proximate the lower edges,
  wherein the rear wall panel is perpendicular with the bottom panel, has equal length side edges, and has the parallel sides of the trapezoid shape being the top and lower edges, with the lower edge being shorter than the top edge,
  wherein each side wall panel has the parallel sides of the trapezoid shape being the top and lower edges, with the lower edge being shorter than the top edge, and
  wherein the front wall panel has equal length side edges and has the parallel sides of the trapezoid shape being the top and lower edges, with the lower edge being shorter than the top edge, and
  (c) a container hanging means comprising:
    (i) a handle member attached at both ends proximate the top edge of the rear wall panel comprising two rod members attached at a median section and at ends of the joined two members to the rear wall panel and sufficiently shaped to position the median section of the joined members above the top edge of the rear wall panel, and
    (ii) a hook member depending from the median section of the handle member and angled downwardly and rearwardly, the hook member comprising joined extensions of the rod members at the median section.

14. The container of claim 13 wherein the panels are stainless steel sheet.

15. A freezable liquid container comprising:
  (a) four flat wall panels, each having a lower edge, a top edge, and two side edges, the wall panels comprising a rear wall panel, two side wall panels, and a front panel, the side edges of the wall panels being coterminous with and sealably connected along the adjacent side edges,
  (b) a bottom panel means comprising a bottom panel with a rear edge, a front edge, and two side edges, with four depending shoulders from the edges of the bottom panel forming an inverted tray shape, the shoulders being coterminous and sealably connected to the wall panels proximate the lower edges, wherein each of the wall panels is a trapezoid shape with the parallel sides of the trapezoid shape being the top and lower edges, and the lower edge being shorter than the top edge, and (c) a container hanging means comprising:
  (i) a handle member attached at both ends proximate the top edge of the rear wall panel comprising two rod members attached at a median section and at ends of the joined two members to the rear wall panel and sufficiently shaped to position the median section of the joined members above the top edge of the rear wall panel, and
  (ii) a hook member depending from the median section of the handle member and angled downwardly and rearwardly, the hook member comprising joined extensions of the rod members at the median section.

16. The container of claim 15 wherein the rear wall panel is perpendicular with the bottom panel.

* * * * *